Patented Oct. 17, 1922.

1,432,440

UNITED STATES PATENT OFFICE.

JOHN BURMEISTER, OF ALAMEDA, CALIFORNIA.

WHITE DRESSING FOR SHOES AND OTHER ARTICLES OF LEATHER AND CLOTH.

No Drawing.  Application filed September 3, 1918. Serial No. 252,447.

*To all whom it may concern:*

Be it known that I, JOHN BURMEISTER, a citizen of the United States, residing at Alameda, in the county of Alameda and State of California, have invented certain new and useful Improvements in White Dressings for Shoes and Other Articles of Leather and Cloth, of which the following is a specification.

My combination of ingredients for white dressing for shoes and other articles of leather and cloth is composed of such materials as will embody a solidity as well as a white appearance, and may be composed of any carbonaceous article that has an adhesive nature with sufficient body to make it of permanent condition and lasting quality. I may use any of the carbonaceous articles that nature produces in her laboratory of organic matter such as all starch products susceptible of being softened to a fluid state for convenience of application and that will, when dry, leave a white finish. I may use such organic products as rice, corn, wheat or potatoes, all of which contain starch, the recovery of which may be varied to suit conditions for which it is to be used either as a waterproof compound or in its natural state.

The starch is preferably assimilated with certain mineral earths such as magnesium and calcium oxides, thus giving the composition a body of substantial character. As an illustration, if I take rice and grind it to a flour and mix it with an oxide of any known metal, I form a compound that changes the character of the organic matter and make it impervious to water, or the metals may be used to make a finishing surface that is not impervious. With this change in the mode of making up the dressing the derivation may be varied to suit the objects for which it is intended.

Having fully described the above invention, what I claim as new and desire to secure by Letters Patent is:—

1. The herein described composition of matter composed of finely ground starchy material mixed with an alkaline earth oxide.

2. The herein described composition of matter composed of rice flour mixed with magnesium oxide.

In testimony whereof, I affix my signature.

JOHN BURMEISTER.